United States Patent
Sawada et al.

(10) Patent No.: US 7,529,240 B2
(45) Date of Patent: May 5, 2009

(54) TRANSMISSION DEVICE

(75) Inventors: Junichi Sawada, Kawasaki (JP); Hidetoshi Amari, Kawasaki (JP); Shinji Takao, Yokohama (JP); Koji Matsunaga, Yokohama (JP); Tatsuya Toyozumi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 557 days.

(21) Appl. No.: 11/060,507

(22) Filed: Feb. 18, 2005

(65) Prior Publication Data

US 2006/0087966 A1  Apr. 27, 2006

(30) Foreign Application Priority Data

Oct. 26, 2004  (JP)  ............................... 2004-310648

(51) Int. Cl.
*H04L 12/28* (2006.01)

(52) U.S. Cl. ..................................................... 370/390
(58) Field of Classification Search ................. 370/163, 370/222, 390, 401; 709/224
See application file for complete search history.

(56) References Cited

U.S. PATENT DOCUMENTS 6,873,627 B1 * 3/2005 Miller et al. ................ 370/466

* cited by examiner

*Primary Examiner*—Chirag G Shah
*Assistant Examiner*—Yong Zhou
(74) *Attorney, Agent, or Firm*—Staas & Halsey LLP (57) ABSTRACT

A transmission device capable of configuring a communication network over which MC packets are forwarded in a way that does not use bands with futility is disclosed. The transmission device is so configured to transmit, when receiving a multicast packet from a host, to the other transmission device the multicast packet that is to be discarded by the transmission device having no necessity of forwarding the received multicast packet to the next transmission device.

7 Claims, 10 Drawing Sheets

| MC ADDRESS | EXISTENCE OR NON-EXISTENCE OF RECEIPT REQUEST |
|---|---|
| 230.1.1.1 | × |
| 230.2.2.2 | ○ |
| 230.3.3.3 | × |
| 230.4.4.4 | × |

20

(b)

| MC ADDRESS | NODE ARRANGEMENT SEQUENCE AND EXISTENCE OR NON-EXISTENCE OF RECEIPT REQUEST | | | | MC_TTL VALUE |
| --- | --- | --- | --- | --- | --- |
| | NODE A | NODE B | NODE C | NODE D | |
| 230.1.1.1 | — | × | ○ | × | 2 |
| 230.2.2.2 | — | ○ | × | ○ | 3 |
| 230.3.3.3 | — | ○ | × | × | 1 |
| 230.4.4.4 | — | × | ○ | × | 2 |

21L (c)

| MC ADDRESS | NODE ARRANGEMENT SEQUENCE AND EXISTENCE OR NON-EXISTENCE OF RECEIPT REQUEST | | | MC_TTL VALUE |
| --- | --- | --- | --- | --- |
| | NODE A | NODE F | NODE E | |
| 230.1.1.1 | — | ○ | × | 1 |
| 230.2.2.2 | — | × | ○ | 2 |
| 230.3.3.3 | — | ○ | × | 1 |
| 230.4.4.4 | — | × | × | 0 |

| MC ADDRESS | NODE ARRANGEMENT SEQUENCE AND EXISTENCE OR NON-EXISTENCE OF RECEIPT REQUEST | | | | | MC_TTL VALUE |
|---|---|---|---|---|---|---|
| | NODE A | NODE B | NODE C | NODE D | NODE E | |
| 230.1.1.1 | — | × | ○ | × | × | 2 |
| 230.2.2.2 | — | ○ | × | ○ | ○ | 4 |
| 230.3.3.3 | — | ○ | × | × | × | 1 |
| 230.4.4.4 | — | × | ○ | × | × | 2 |

21L (b)

| MC ADDRESS | NODE ARRANGEMENT SEQUENCE, ETC. | | MC_TTL VALUE |
|---|---|---|---|
| | NODE A | NODE F | |
| 230.1.1.1 | — | ○ | 1 |
| 230.2.2.2 | — | × | 0 |
| 230.3.3.3 | — | ○ | 1 |
| 230.4.4.4 | — | × | 0 |

| MC ADDRESS | NODE ARRANGEMENT SEQUENCE AND EXISTENCE OR NON-EXISTENCE OF RECEIPT REQUEST | | | | MC_TID |
|---|---|---|---|---|---|
| | NODE A | NODE B | NODE C | NODE D | |
| 230.1.1.1 | — | × | ○ | × | NODE C |
| 230.2.2.2 | — | ○ | × | ○ | NODE D |
| 230.3.3.3 | — | ○ | × | × | NODE B |
| 230.4.4.4 | — | × | ○ | × | NODE C |

41L (b)

| MC ADDRESS | NODE ARRANGEMENT SEQUENCE AND EXISTENCE OR NON-EXISTENCE OF RECEIPT REQUEST | | | MC_TTL VALUE |
|---|---|---|---|---|
| | NODE A | NODE F | NODE E | |
| 230.1.1.1 | — | ○ | × | NODE F |
| 230.2.2.2 | — | × | ○ | NODE E |
| 230.3.3.3 | — | ○ | × | NODE F |
| 230.4.4.4 | — | × | × | (null) |

TRANSMISSION DEVICE

BACKGROUND OF THE INVENTION

1. Field of the Invention

The present invention relates to a transmission device for configuring a communication network in a ring type or cascade type topology, wherein the respective transmission devices are connected to a specified network.

2. Description of the Related Art

Over the recent years, a network (which will hereinafter be referred to as an RPR network) utilizing a transmission technology called RPR (Resilient Packet Ring) has come to be employed.

Figure 11:
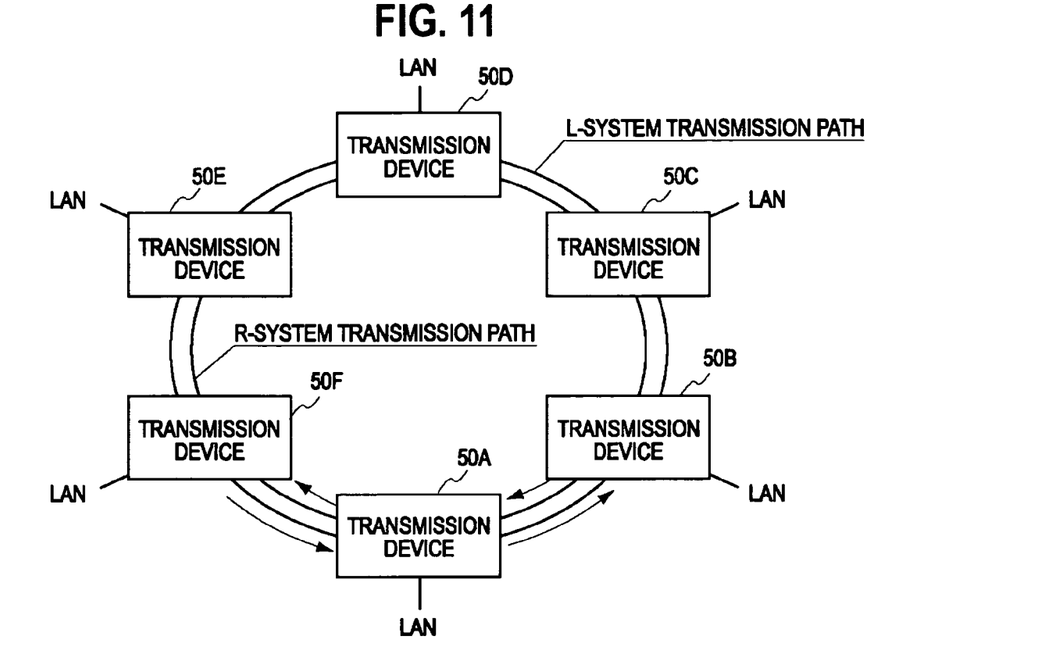
FIG. 11 is a view of an architecture of an existing RPR network.

As schematically illustrated in FIG. 11, this RPR network is a network having an architecture in which a plurality (six pieces of devices in FIG. 11) of transmission devices 50 (50A trough 50F) are connected in a ring configuration (ring topology) via 2-system transmission paths.

Then, the RPR network is a network (the network enabling bands to be utilized more effectively than by SONET/SDH (Synchronous Optical Network/Synchronous Digital Hierarchy) in which one-side transmission path is dedicatedly used for recovery from a fault) enabling simultaneous data flows to the 2-system transmission paths, and hence a variety of transmission devices 50 capable of building up the RPR network are developed.

In the RPR network using the existing transmission devices 50, however, each of the transmission devices 50 judges whether a certain multicast packet (which will hereinafter be abbreviated to an MC packet) transmitted (forwarded) by a host to all the transmission devices 50 should be dropped (flowed onto a LAN) or not.

Figure 12:
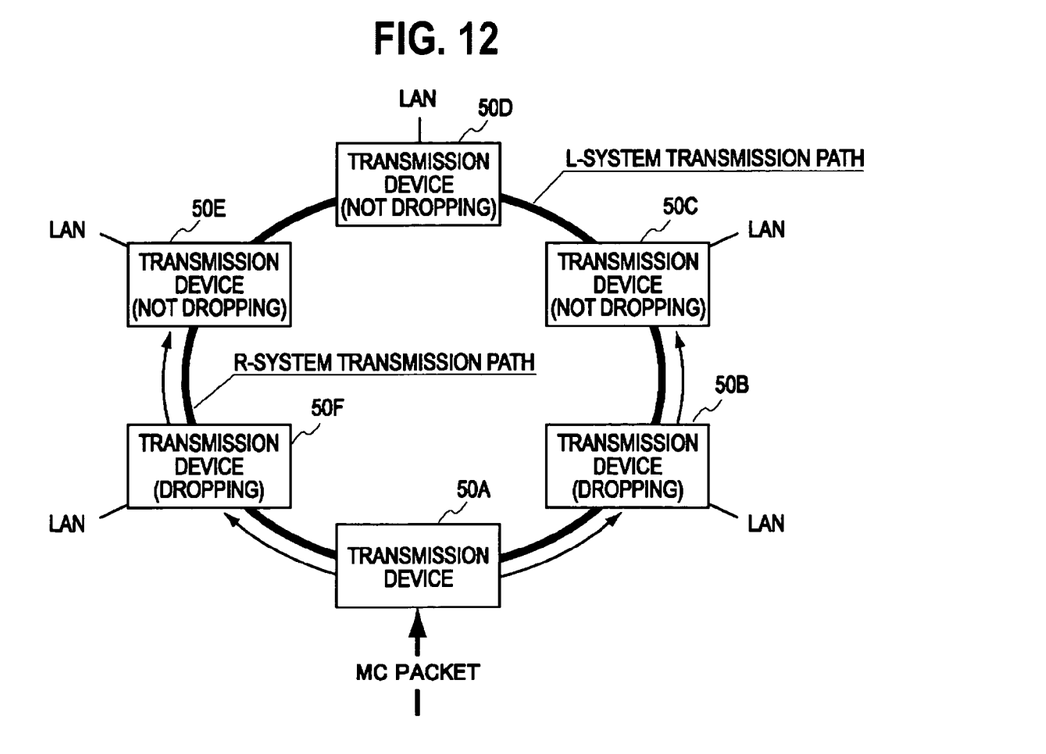
FIG. 12 is an explanatory view showing a problem of the existing RPR network.

Therefore, in the RPR network using the existing transmission devices 50, as schematically shown in FIG. 12, when forwarding the MC packet, some of the transmission devices 50 execute a process of forwarding to the next transmission devices 50 the MC packet that is not dropped by any of the subsequent transmission devices 50 (which is, namely, the MC packet essentially having no necessity of being forwarded).

SUMMARY OF THE INVENTION

Under such circumstances, it is an object of the present invention to provide a transmission device capable of configuring a communication network over which MC packets are forwarded in a way that does not use bands with futility.

To accomplish the above object, according to the present invention, a transmission device for configuring a ring or cascade type communication network which consists of two or more transmission devices and is used in such a form of each of said transmission devices being connected to a specified network, comprises multicast address storage means for storing a multicast address of each multicast packet that should be transmitted onto the network connected to the self-transmission-device, multicast packet receiving means for receiving the multicast packet where discard condition information is set, which is transmitted the other transmission device, multicast packet drop means for transmitting, as far as the multicast address set in the multicast packet received by the multicast packet receiving means is coincident with any one of multicast addresses stored in the multicast address storage means, the multicast packet onto the network connected to the self-transmission-device, multicast packet transferring means for transferring, if the discard condition information set in the multicast packet received by the multicast packet receiving means does not indicate discarding by the self-transmission-device, the multicast packet to the next transmission device, and discarding, if the discard condition information set in the multicast packet received by the multicast packet receiving means indicates discarding by the self-transmission-device, the multicast packet without transferring the multicast packet to the next transmission device, architecture information etc storage means for storing architecture information showing an arrangement sequence of the plurality of transmission devices configuring the communication network, and all the multicast addresses stored in the multicast address storage means with respect to the respective transmission devices, information updating means for executing a process of updating most the multicast address stored in the architecture information etc storage means with respect to each of the transmission devices, and multicast packet transmitting means for specifying based on the information stored in the architecture information etc storage means, when the multicast packet is transmitted from the host on the network connected to the self-device, the transmission device having no necessity of transferring the multicast packet to the next transmission device, and transmitting to the next transmission device the multicast packet in which to set discard condition information from which the multicast packet transfer means of the specified transmission device judges that the multicast packet be indicated to be discarded by the self-transmission-device.

In the ring type or cascade type communication network configured by using the plurality of transmission devices each having the construction described above, the multicast packet from a host is discarded by a specified transmission device (a transmission device having no necessity of transferring the received multicast packet to the next transmission device. Accordingly, the communication network configured by use of the transmission devices according to the present invention functions as the network (having a smaller quantity of bands employed for forwarding the multicast packet than in the existing communication network where the multicast packet is forwarded to all the transmission devices), wherein the multicast packet is forwarded in a way that does not use the bands with futility.

On the occasion of actualizing the transmission device according to the present invention, a variety of means can be employed as the multicast packet transmitting means and the multicast packet transfer means (means using the discard condition information). For example, the multicast transmitting means can involve adopting means for transmitting the multicast packet in which a piece of identifying information of the specified transmission device is set as the discard condition information, and the multicast transfer means can involve adopting means for judging that the discard condition information coincident with the identifying information of the self-transmission-device indicates discarding by the self-transmission-device. Further, the multicast packet transmitting means can involve adopting means for transmitting to the next transmission device the multicast packet in which a hop count up to the specified transmission device is set as the discard condition information by the multicast packet transmitting means, and the multicast transfer means can involve adopting means that, if the discard condition information set in the multicast packet received by the multicast packet receiving means is not "1", alters the discard condition information to the information representing a numerical value smaller by "1" than the previous discard condition information, and thereafter transfers this multicast packet to the next transmission device but discards this multicast packet without transferring to the next transmission device if the discard condition information is "1".

Moreover, the transmission device according to the present invention can be constructed as a device capable of configuring the communication network having 2-system transmission paths.

On the occasion of actualizing the transmission device according to the present invention, in case the fault occurs, for preventing the multicast packet from being unable to be received by a node requesting receipt of the multicast packet, it is desirable that the multicast packet transmitting means desirably involves adopting means that moves to a status of, when detecting that a fault occurs in the communication network, transmitting the multicast packet in which to set the discard condition information from which the multicast packet transfer means of any of the other transmission devices does not judge that the multicast packet be indicated to be discarded by the self-transmission-device.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

A best mode for carrying out the present invention will hereinafter be described in depth with reference to the drawings.

First Embodiment

Figure 1:
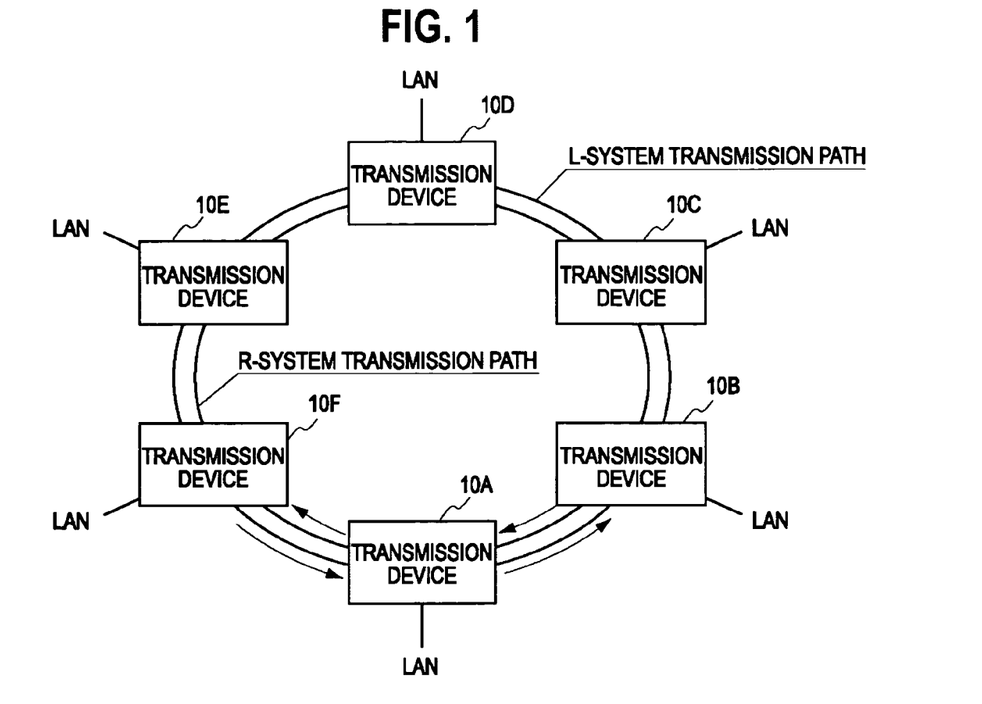
FIG. 1 is an explanatory an explanatory view of a ring type (ring topology) network configured by using transmission devices according to a first embodiment of the present invention.

As shown in FIG. 1, transmission devices 10 (10A through 10F) according to a first embodiment of the present invention are devices for configuring a ring type (ring topology) network in which a plurality of transmission devices 10 (six pieces of devices in FIG. 1) are connected to each other via an L-system transmission path and an R-system transmission path. Further, though not illustrated, the transmission devices 10 according to the first embodiment are devices capable of configuring a cascade topology network, wherein the plurality of transmission devices 10 are connected via 2-system transmission paths.

Figure 2:
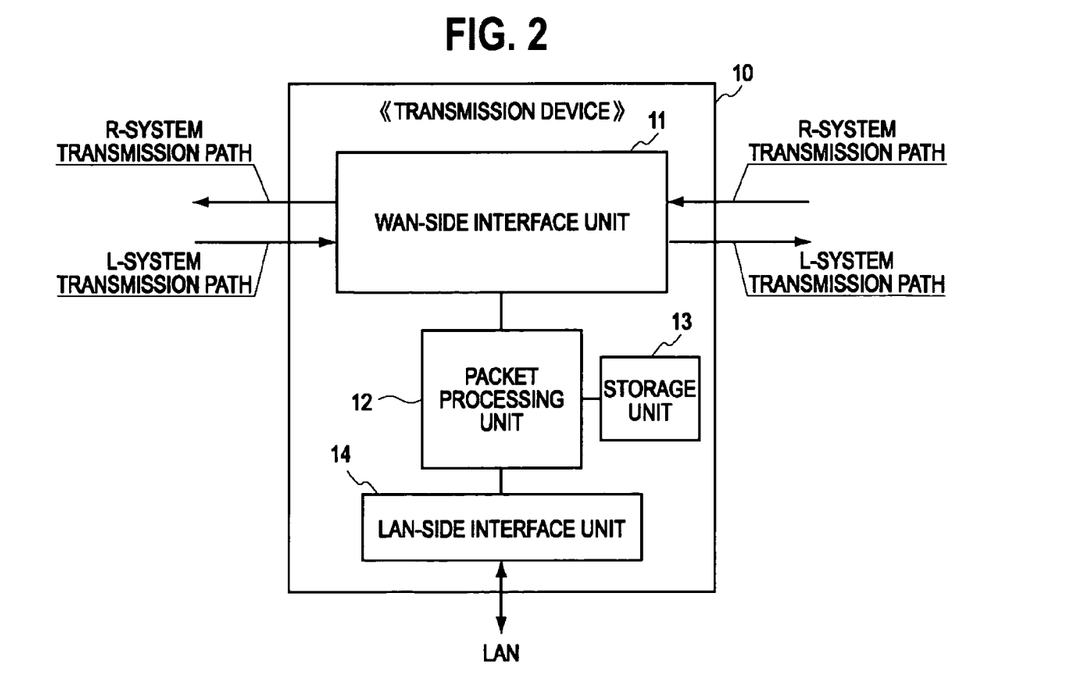
FIG. 2 is a view of a construction of the transmission device according to the first embodiment.

As shown in FIG. 2, this transmission device 10 includes, as main components thereof, a WAN-side interface unit 11, a packet processing unit 12, a storage unit 13, and a LAN-side interface unit 14. Note that the transmission device 10 has characteristics about an operational content related to a multicast packet (which will hereinafter be abbreviated to MC packet), and hence, in the following discussion, the description will be focused on an architecture and an operation of the transmission device 10, which are related to transmitting and receiving the MC packet.

The WAN-side interface unit 11 provided in this transmission device 10 is a unit executing a process of transmitting (forwarding) the MC packet (transmitting the packet along on the L-system transmission path) transmitted via the L-system transmission path to a next transmission device 10 and supplying the packet to the packet processing unit 12, a process of forwarding the MC packet (transmitting the packet along on the R-system transmission path) transmitted via the R-system transmission path to a next transmission device 10 and supplying the packet to the packet processing unit 12, and transmitting the MC packet of which the transmission is requested by the packet processing unit 12 along on the L- and R-system transmission paths.

This WAN-side interface unit 11 is structured, unlike the same type of unit within the existing transmission device, to transmit and receive, as the MC packet, a packet of which a header contains a MC_TTL (Time-To-Live) value (an in-depth explanation thereof will be given later on) defined as a piece of numerical value information. Further, the WAN-side interface unit 11 is also structured, when receiving the MC packet transmitted by other transmission device 10 (the WAN-side interface unit 11), to decrement the MC_TTL value set in this PC packet by "1" and to transmit, unless the MC_TTL value after being changed is "0", the received MC packet (with the MC_TTL value changed) to the next transmission device 10. Note that the WAN-side interface unit 11 is a unit that invariably (even when the MC_TTL value after being decremented by "1" is "0") supplies the packet processing unit 12 with the MC packet received from the other transmission device 10.

The LAN-side interface unit 14 is a unit executing a process of transmitting the packet having a content designated by the packet processing unit 12 onto a subordinate LAN (connected to the self-transmission-device 10), and a process of supplying the packet processing unit 12 with the packet transmitted from a host (which is a computer capable of transmitting the MC packet) on the LAN.

The storage unit 13 is a unit for storing various categories of information (which will be explained in detail later on) utilized by the packet processing unit 12 when in its operation.

The packet processing unit 12 is a unit, when supplied with the MC packet from the WAN-side interface unit 11, judging whether or not this MC packet is required to be outputted to the LAN side and, if judged so, instructing the LAN-side interface unit 14 to transmit the MC packet onto the LAN. Moreover, the packet processing unit 12 is also a unit executing a process of managing the network architecture including the self-transmission-device 10, a process of causing the WAN-side interface unit 11 to transmit the MC packet supplied from the LAN-side interface unit 14, and so on.

Figure 3:
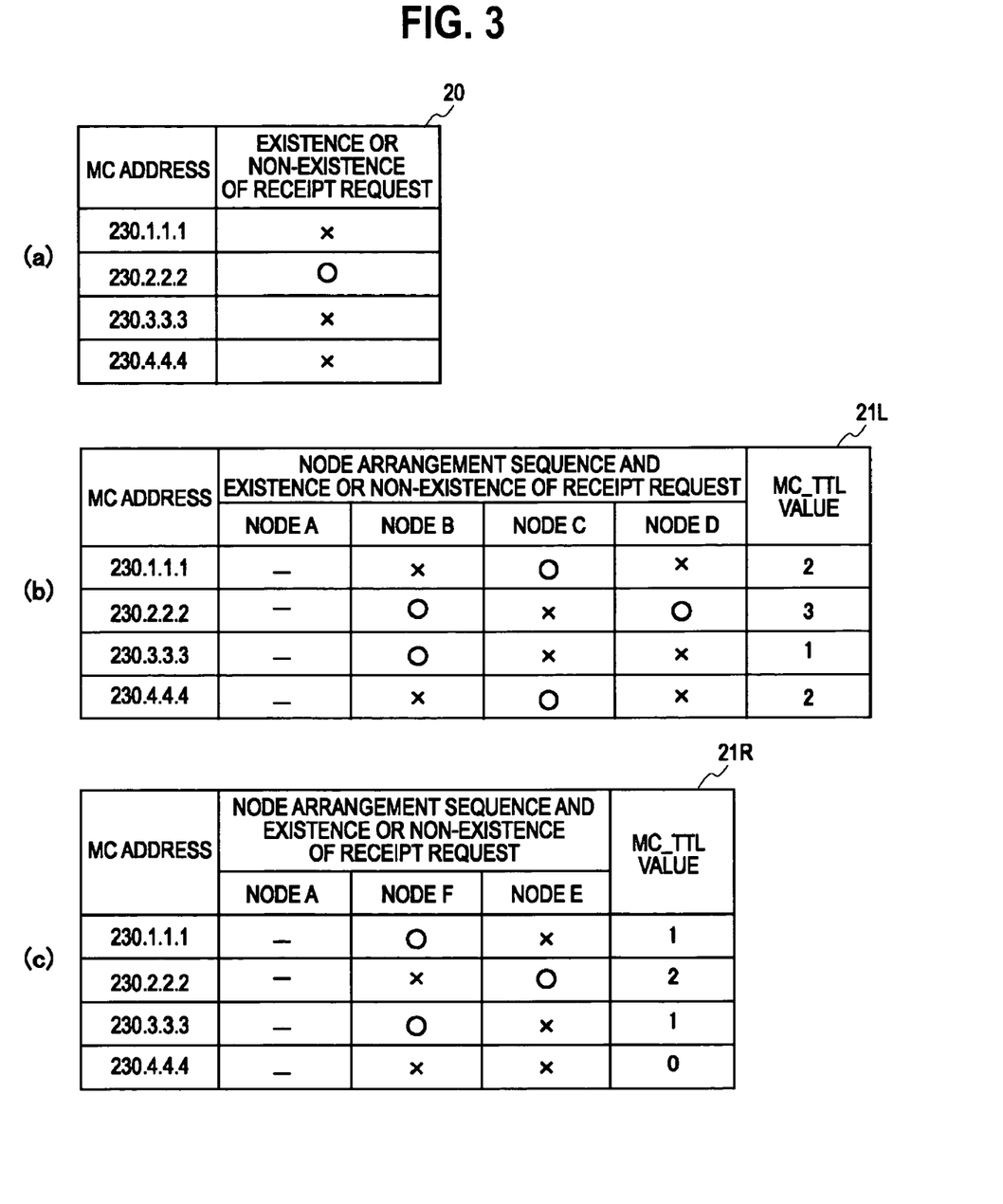
FIG. 3 is an explanatory diagram of a variety of tables prepared within the transmission device according to the first embodiment.

Then, the process (which will hereinafter be termed an architecture management process) that the packet processing unit 12 manages the network architecture including the self-transmission-device 10, is a process of storing the storage unit 13 with, as schematically illustrated in FIG. 3, a receipt request table 20, an R-system MC_TTL value table 21R and an L-system MC_TTL value table 21L by performing the communications with other packet processing unit 12 or with the host. Note that the respective tables shown in FIG. 3 are stored on the storage unit 13 of the transmission device 10A (the transmission device 10 will hereinafter be referred to also as a node).

To be more specific, the architecture management process conducted by the packet processing unit 12 is a process of storing the storage unit 13 with the receipt request table 20 that retains setting of a multicast address (which is also termed a multicast group address and will hereinafter be simply be called the MC address) of the MC packet that should be dropped (transmitted onto the subordinate LAN) by the packet processing unit 12 itself by performing the communications with the host on the subordinate LAN.

Further, the architecture management process is a process of storing, through the transfer and the receipt of a token packet and an MC address notification packet to and from the other packet processing unit 12, the storage unit 13 with the L-system MC_TTL value table 21L having a structure shown in FIG. 3(*b*), i.e., the L-system MC_TTL value table 21L that retains setting of information representing a node arrangement sequence of a group of nodes (the transmission devices 10) over which the MC packet is transferred (hopped) via the L-system transmission path, and setting of information (○/x) indicating whether or not each of the nodes constituting the node group accepts a receipt request of the MC packet identified by each (unique.) MC address, and setting of a hop count, as an MC_TTL value per MC address, up to the remotest node (if such a node does not exist, the hop count is "0") accepting the receipt request of the MC packet identified by its MC address, and with the R-system MC_TTL value table 21R having a structure shown in FIG. 3(*c*), i.e., the R-system MC_TTL value table 21R that retains setting of information representing a node arrangement sequence of a group of nodes (the transmission devices 10) over which the MC packet is hopped via the R-system transmission path, and setting of information (○/x) indicating whether or not each of the nodes constituting the node group accepts the receipt request of the MC packet identified by each MC address, and setting of the hop count, as the MC_TTL value per MC address, up to the remotest node (if such a node does not exist, the hop count is "0") accepting the receipt request of the MC packet identified by its MC address.

Note that the token packet represents a packet circulating with a fixed period across the network for controlling bands. This token packet is employed also in the existing network. Hence, the token packet, though its detailed explanation is omitted, contains pieces of node identifying information of the nodes configuring the network in such a form as to make explicit the node arrangement sequence.

Figure 4:
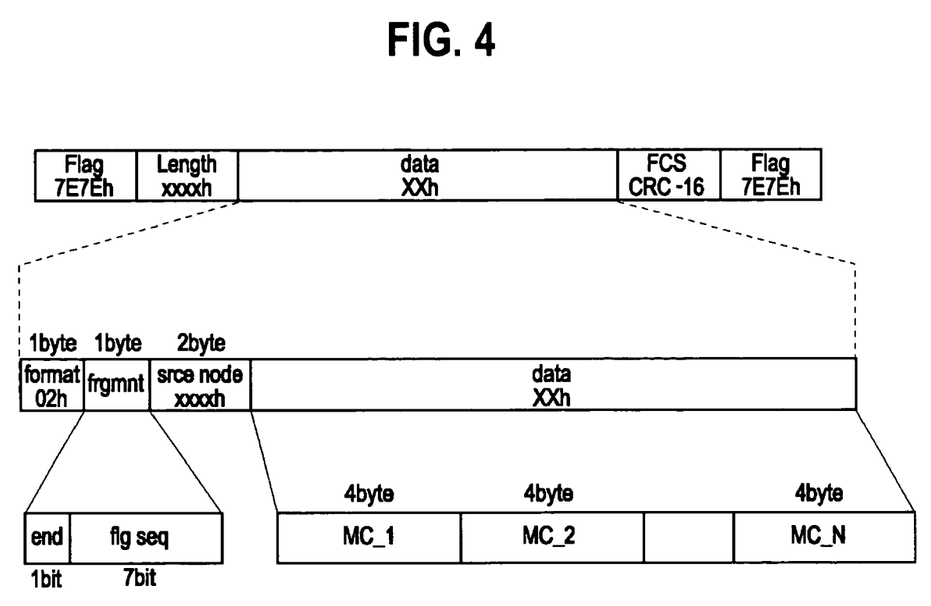
FIG. 4 is an explanatory diagram of an MC address notification packet transmitted and received by the transmission device according to the first embodiment.

Moreover, the MC address notification packet connotes a packet having a structure shown in FIG. 4, which is periodically broadcast by the packet processing unit 12. Namely, the MC address notification packet is a packet containing a piece of source node identifying information ("srce node") and a group of MC addresses ("MC_1", "MC_2",etc) with the receipt request accepted by a source node. Note that this MC address notification packet is a packet that is not transmitted by the existing transmission devices. Further, a "frgmnt" field contained in the MC address notification packet is a field (the field used for notifying other transmission devices 10 of such a number of MC address groups as not to be transmittable through on the single MC address notification packet in a way that allocates these MC address groups to a plurality of MC address notification packets) provided because of a maximum packet size transferable and receivable between the transmission devices 10 being 1558 bytes.

Then, a process (which will hereinafter be termed an MC packet transmitting process) executed by the packet processing unit 12 for transmitting the MC packet supplied from the LAN-side interface unit 14 to the WAN-side interface unit 11, is a process executed in a procedure shown in FIG. 5.

Specifically, when the MC packet is supplied from the LAN-side interface unit 14, the packet processing unit 12, to begin with, judges whether or not a target MC address (which is an MC address set in the supplied MC packet) is stored in the L-system MC_TTL value table 21L (see FIG. 3(*b*) showing the L-system table) (step S101).

Then, the packet processing unit 12, when the target MC address is stored in the L-system MC_TTL value table 21L (step S101; Yes), reads an MC_TTL value associated with this target MC address from the L-system MC_TTL value table 21L (step S102). Subsequently, the packet processing unit 12 judges whether the MC_TTL value read from the L-system MC_TTL value table 21L is "0" or not (step S103). If the MC_TTL value is not "0" (step S103; No), the packet processing unit 12 executes a process (step S104; a process of instructing the WAN-side interface unit 11 to transmit the MC packet) for transmitting onto the L-system transmission path the MC packet attached with a header in which the MC_TTL value is set, and thereafter starts processing from step S111 onward.

Whereas if the target MC address is not stored in the L-system MC_TTL value table 21L (step S101; No), the packet processing unit 12 starts processing from step S111 onward without causing the WAN-side interface unit 11 to transmit the MC packet onto the L-system transmission path. Further, the packet processing unit 12, if the MC_TTL value read from the L-system MC_TTL value table 21L is "0" (step S103; Yes), also starts processing from Step S111 without causing the WAN-side interface unit 11 to transmit the MC packet onto the R-system transmission path.

Then, the packet processing unit 12, which has started processing from S111 onward (the processes in steps S111 through S114), at first judges whether or not the target MC address is stored in the R-system MC_TTL value 21R (see FIG. 3(*c*) showing the R-system table) (step S111). If the target MC address is stored in the R-system MC_TTL value 21R (step S111; YES), the packet processing unit 12 reads the MC_TTL value associated with this target MC address from the R-system MC_TTL value table 21R (step S112). Subsequently, the packet processing unit 12 judges whether the MC_TTL value read from the R-system MC_TTL value table 21R is "0" or not (step S113). If the MC_TTL value is not "0" (step S113; NO), the packet processing unit 12 executes a process of transmitting onto the R-system transmission path the MC packet attached with a header in which the MC_TTL value is set (step S114), and thereafter terminates this MC packet processing process.

Whereas if the target MC address is not stored in the R-system MC_TTL value table 21R (step S111; NO), the packet processing unit 12 terminals this MC packet transmitting process without causing the WAN-side interface unit 11 to transmit the MC packet onto the R-system transmission path. Further, the packet processing unit 12, if the MC_TTL value read from the R-system MC_TTL value table 21R is "0" (step S113; YES), likewise terminates the MC packet transmitting process without causing the WAN-side interface unit 11 to transmit the MC packet onto the R-system transmission path.

The transmission device 10 according to the first embodiment includes the WAN-side interface unit 11 and the packet processing unit 12 that function as described above.

Therefore, in the ring topology (or cascade topology) network configured by use of the transmission devices 10 according to the first embodiment, it follows that the MC packet is transmitted in a form that does employ the bands with futility.

Figure 6:
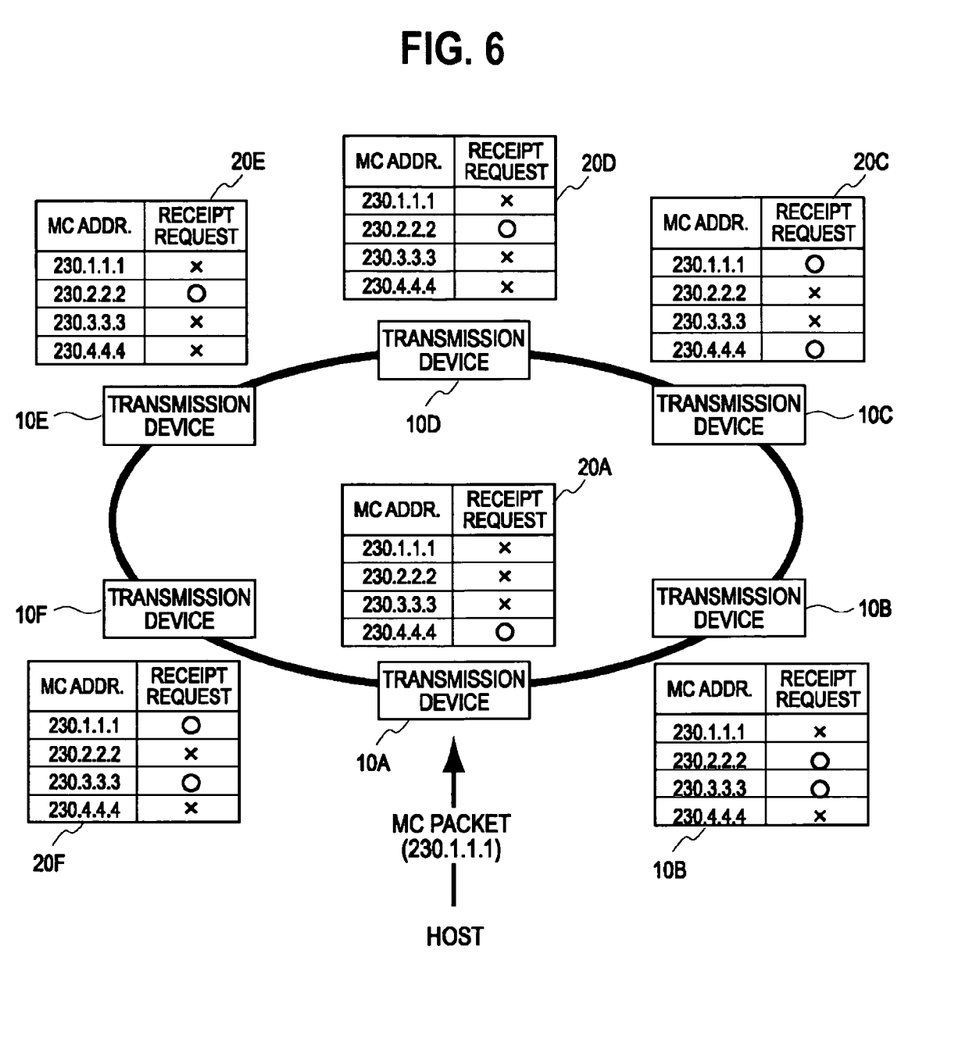
FIG. 6 is an explanatory diagram of the ring type network configured by using the transmission devices according to the first embodiment.

Specifically, there exists, for instance, the ring topology network having an architecture shown in FIG. 6, and, in a state where contents in a receipt request table 20C of each of transmission devices 10X (X=A through F) are those shown in FIG. 6 (in other words, in a state where the respective tables within the transmission device 10A have the contents shown in FIG. 3), it is considered that the MC packet with "230.1.1.1" set as an MC address is transmitted from the host on the LAN connected to the transmission device 10A.

In this case, the L-system MC_TTL value table 21L (see FIG. 3(*b*)) in the transmission device 10A is stored with an MC_TTL value "2" in a form of being associated with the MC address "230.1.1.1". Hence (refer to steps S101 through S104 in FIG. 5), it follows that the MC packet in which "2" is set as the MC_TTL value is transmitted by the transmission device 10A onto the L-system transmission path (to the transmission device 10B). Further, the R-system MC_TTL value table 21R (see FIG. 3(*c*)) in the transmission device 10A is stored with an MC_TTL value "1" in a form of being associated with the MC address "230.1.1.1". Hence, it follows that the MC packet in which "1" is set as the MC_TTL value is transmitted by the transmission device 10A onto the R-system transmission path (to the transmission device 10F).

Then, the WAN-side interface unit 11 in each transmission device 10 is the unit that, as already explained, when receiving the MC packet, executes the process of supplying this MC packet to the packet processing unit 12, and the process of decrementing the MC_TTL value set in this MC packet by "1" and, unless the MC_TTL value after being changed is "0", transmitting the received MC packet (with the MC_TTL value changed) to the next transmission device 10.

Therefore, it follows that the WAN-side interface unit 11 in the transmission device 10B receiving the MC packet transmitted onto the L-system transmission path by the transmission device 10A, executes a process of transmitting the MC packet, after changing the MC_TTL value to "1", to the transmission device 10C, and a process of supplying the MC packet to the packet processing unit 12. Note that, in this case, "230.1.1.1" is the MC address with no receipt request accepted, and hence the MC packet supplied to the packet processing unit 12 from the WAN-side interface unit 11 is discarded by the packet processing unit 12 without being transmitted onto the LAN.

Moreover, the WAN-side interface unit 11 within the transmission device 10C receiving the MC packet from the transmission device 10B, as a value obtained by decrementing the MC_TTL value within the received MC packet by "1" comes to "0", executes only the process of supplying the MC packet to the packet processing unit 12. Further, "230.1.1.1" is the MC address with the receipt request accepted, and therefore it follows that the packet processing unit 12 in the transmission device 10C executes the process of transmitting onto the LAN the MC packet supplied from the WAN-side interface unit 11.

The WAN-side interface unit 11 within the transmission device 10F receiving the MC packet transmitted onto the R-system transmission path from the transmission device 10A likewise, the value obtained by decrementing the MC_TTL value within the received MC packet by "1" becoming "0", executes only the process of supplying the MC packet to the packet processing unit 12. Then, "230.1.1.1" is the MC address with the receipt request accepted, and hence it follows that the packet processing unit 12 in the transmission device 10C executes the process of transmitting onto the LAN the MC packet supplied from the WAN-side interface unit 11.

Thus, the ring topology network configured by using the transmission devices 10 according to the first embodiment is the network in which the multicast packet transmitted by the host is forwarded in such a way that the specified transmission device (having no necessity of forwarding the received multicast packet to the next transmission device) discards this multicast packet. Accordingly, it can be said that the communication network configured by use of the transmission devices 10 is the network wherein the multicast packet is forwarded in a way that does not employ the bands with futility (the network requiring a smaller quantity of bands employed for transmitting the multicast packets than in such an existing communication network that the multicast packet is forwarded to all the transmission devices).

Finally, an operation of the transmission device 10 in case of a fault occurred somewhere in the ring topology network including the self-device, will be briefly explained.

The packet processing unit 12 in the transmission device 10 has a function of detecting the fault occurred in the self-transmission-device 10, and is constructed as a unit notifying, when detecting the fault occurred, the other transmission devices 10 (the packet processing units 12) that the fault has occurred by use of 1-bit-added RAS (Reliability/Availability/Serviceability) information for notifying of the occurrence of the fault.

Further, the packet processing unit 12 is, if the fault occurs somewhere in the ring topology network including the self-device (if the packet processing unit 12 itself detects the fault occurred, or if notified of the occurrence of the fault from the other packet processing unit 12), constructed as a unit operating as follows.

Figure 5:
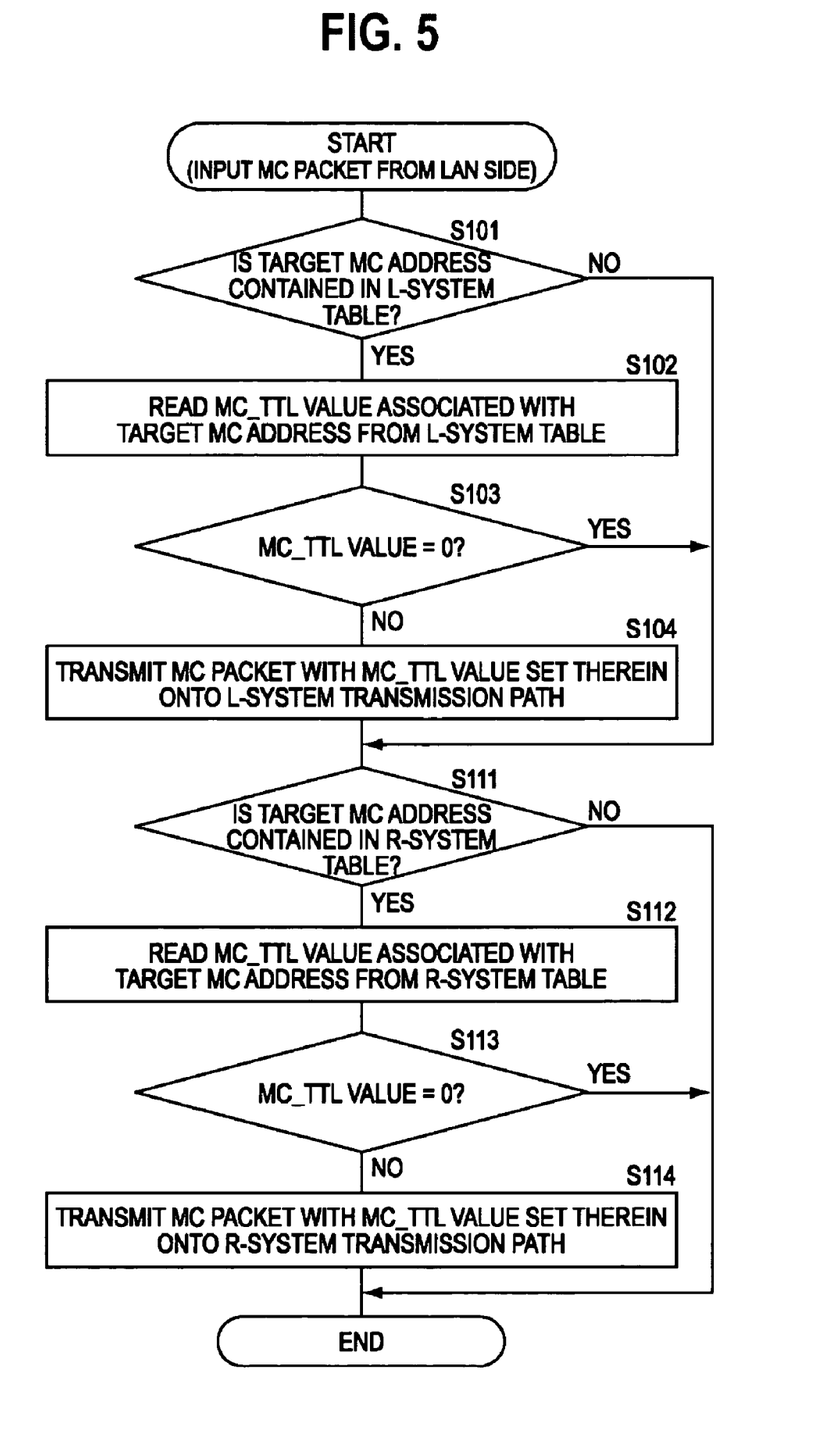
FIG. 5 is a flowchart of an MC packet transmitting process executed by the transmission device according to the first embodiment.
Figure 7:
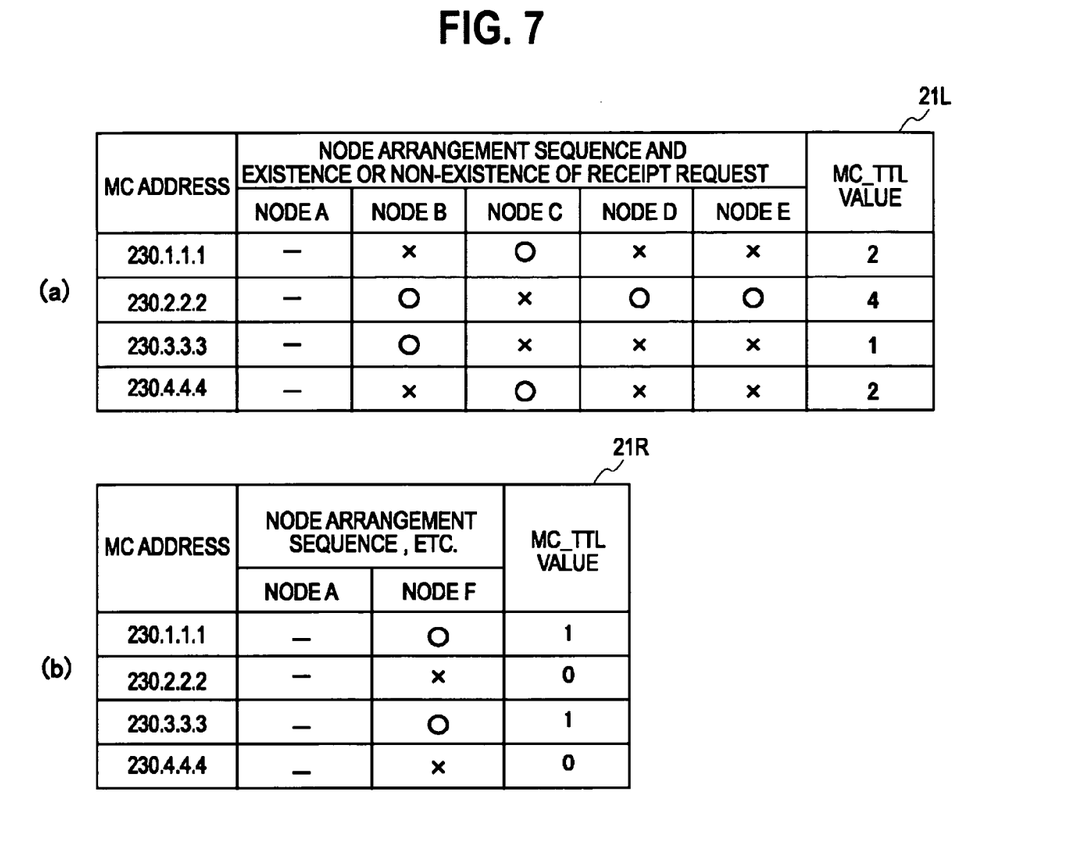
FIG. 7 is an explanatory diagram of an operation of the transmission device according to the first embodiment when a fault occurs.

If the fault occurs somewhere in the ring topology network including the self-device, the packet processing unit 12, to start with, moves to a status of executing a process, as the MC packet transmitting process but not as the process in the procedure shown in FIG. 5, of transmitting onto the L- and R-system transmission paths the MC packet in which a pre-determined value (which is the maximum value of the number of the transmission devices 10 capable of configuring the ring topology network) serving as the MC_TTL value is set, and starts a process (a process for adapting (updating) the contents of the respective MC_TTL value tables 20 to the present situation [the situation after the occurrence of the fault] by performing the communications with the other packet processing units 12) of re-creating the L-system MC_TTL value table 21 and the R-system MC_TTL value table 21R. Then, the packet processing unit 12, with completion of this process, for example, when the contents of the L-system MC_TTL value table 21L and the R-system MC_TTL value table 21R become those shown respectively in FIGS. 7(*a*) and 7(b), moves to a status of executing the process in the procedure shown in FIG. 5 as the MC packet transmitting process. Incidentally, FIGS. 7(a) and 7(b) are diagrams showing the contents of the L-system MC_TTL value table 21L and the R-system MC_TTL value table 21R within the transmission device 10A after some sort of fault has occurred in the R-system transmission path between the transmission device 10E and the transmission device 10F in the ring topology network having the architecture shown in FIG. 6.

In short, the ring topology network configured by using the transmission devices 10 according to the first embodiment is the network, wherein the packet processing unit 12 in each of the transmission devices 10, if the fault occurs somewhere therein, temporarily moves the status of executing the process, as the MC packet transmitting process, of causing the WAN-side interface unit 11 to transmit the MC packet that is not discarded depending on the MC_TTL value, and, when completing the updating of the contents of the L-system MC_TTL value table 21L and the R-system MC_TTL value table 21R in each of the transmission devices 10, returns to the status where the band is not used for forwarding the MC packet that is not supplied to the LAN side.

Second Embodiment

Figure 8:
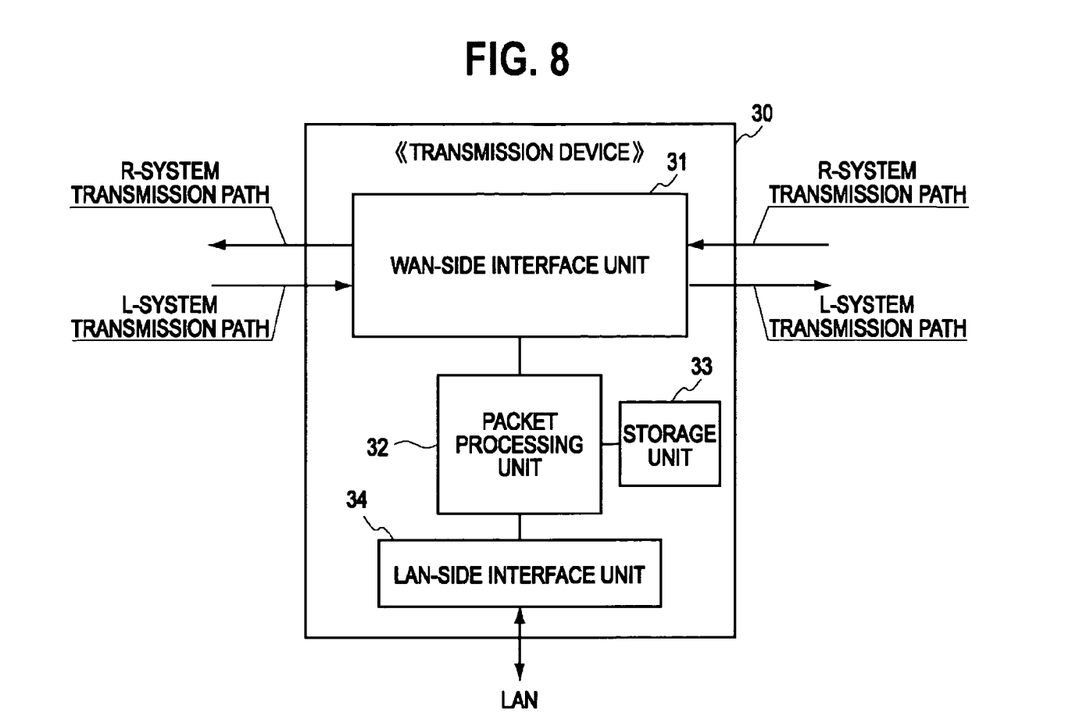
FIG. 8 is a diagram of a construction of the transmission device according to a second embodiment of the present invention.

As shown in FIG. 8, a transmission device according to a second embodiment of the present invention is a device including, as main components, a WAN-side interface unit 31, a packet processing unit 32, a storage unit 33 and a LAN-side interface unit 34.

A configuration and an operation of the transmission device 30 will be explained in a way that puts a focus on differences from the transmission device 10.

The WAN-side interface unit 11 provided in the transmission device 10 according to the first embodiment is the unit transmitting and receiving, as the MC packet, the packet of which the header contains the MC_TTL value. The WAN-side interface unit 31 provided in the transmission device 30 according to the second embodiment is, however, a unit transmitting and receiving, as the MC packet, a packet of which a header contains a MC_TID (identifying information of the transmission device 30; an in-depth explanation will be given later on).

Further, the WAN-side interface unit 31 is a unit, when receiving the MC packet transmitted by other transmission device 30 (the WAN-side interface unit 31), judging whether the MC_TID set in this MC packet is the identifying information of the self-device or not, and transmitting, unless the MC_TID is not the identifying information of the self-device, the received MC packet to the next transmission device 30. Note that the WAN-side interface unit 31 is a unit supplying, as by the WAN-side interface unit 11, a packet processing unit 32 with the MC packet received from other transmission device 30 invariably (irrespective of whether or not the MC_TID is the identifying information of the self-device).

Figure 9:
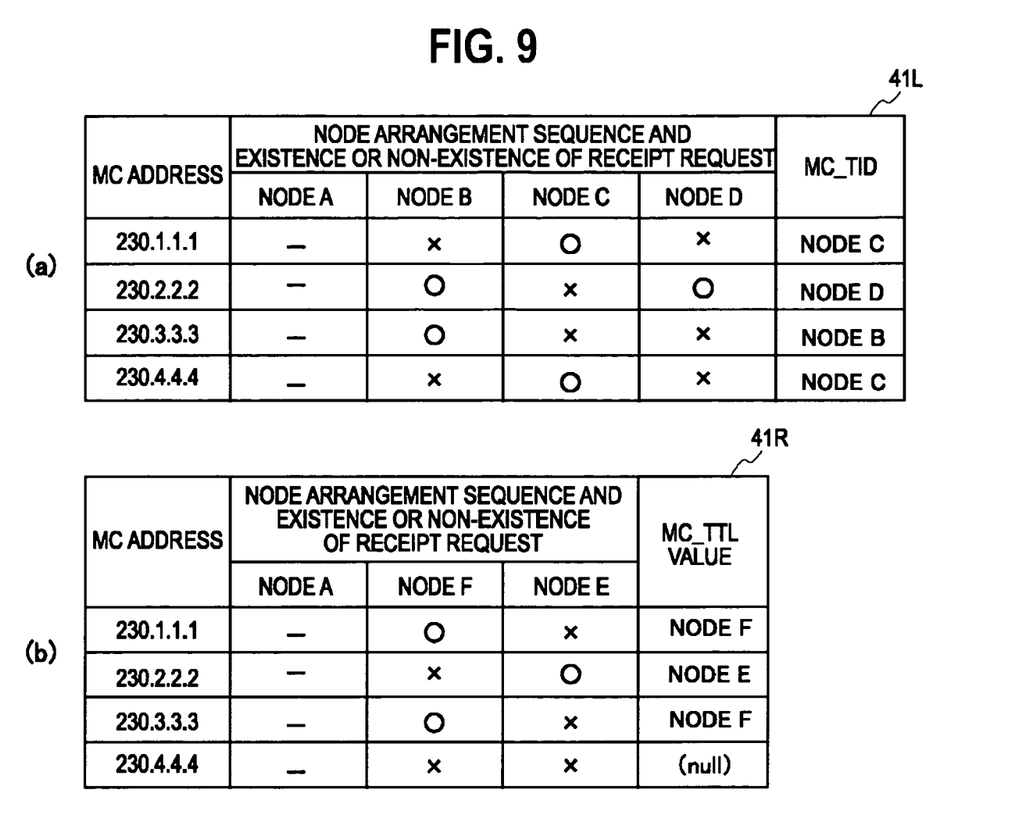
FIG. 9 is an explanatory diagram of a variety of tables prepared in the transmission device according to the second embodiment.

The packet processing unit 12 within the transmission device 10 is the unit storing the storage unit 13 with the receipt request table 20, the L-system MC_TTL value table 21L and the R-system MC_TTL value table 21R that have the contents corresponding to the situation at that point of time. The packet processing unit 32 in the transmission device 30 is, however, a unit storing a storage unit 33 with an L-system MC_TID table 41L having a structure shown in FIG. 9(a) and an R-system MC_TID table 41R having a structure shown in FIG. 9(b) in place of the L-system MC_TTL table 21L and the R-system MC_TTL table 21R.

As obvious from a comparison between FIGS. 9 and 3, the L-system MC_TID table 41L prepared on the storage unit 33 by the packet processing unit 32 is a table in a modified version of the L-system MC_TTL table 21L, which is stored with MC_TID, as a substitute for the MC_TTL value, defined as a piece of identifying information of the remotest node (if none of such a node exists, "null" is entered) accepting the receipt request of the MC packet identified by an MC address associated with this packet. Further, the R-system MC_TID table 41R is also a table in a modified version of the R-system MC_TTL table 21R, which is stored with MC_TID as a substitute for the MC_TTL value.

Figure 10:
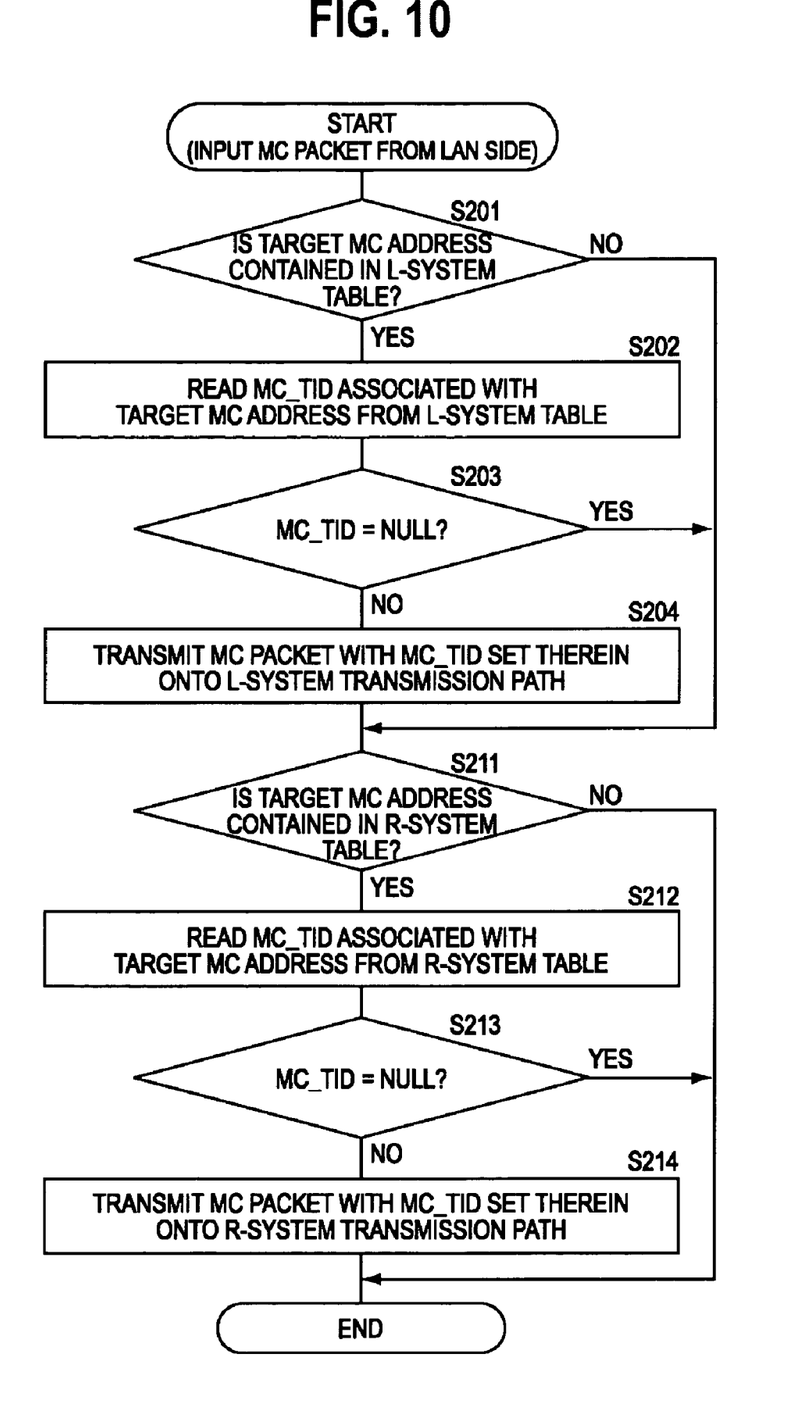
FIG. 10 is a flowchart of an MC packet transmitting process executed in the transmission device according to the second embodiment.

Then, the packet processing unit 32 is constructed as a unit executing, when supplied with the MC packet from the LAN-side interface unit 14, the MC packet transmitting process in a procedure shown in FIG. 10.

Namely, when supplied with the MC packet from the LAN-side interface unit 14, the packet processing unit 32, to start with, judges whether or not a target MC address (an MC address set in the supplied MC packet) is stored in the L-system MC_TID table 41L (see FIG. 9(a) showing the L-system table) (step S201).

Then, the packet processing unit 32, if the target MC address is stored in the L-system MC_TID table 41L (step S201; YES), reads the MC_TID associated with this target MC address from the L-system MC_TID table 41L (step S202). Subsequently, the packet processing unit 32 judges whether the MC_TID read from the L-system MC_TID table 41L is "null" or not (step S203). If the MC_TID is not "null" (step S203; NO), the packet processing unit 32 executes a process (step S204; a process of instructing the WAN-side interface unit 31 to transmit the MC packet) of transmitting onto the L-system transmission path the MC packet attached with the header in which the MC_TID is set, and thereafter starts processes from step S211 onward.

Whereas if the target MC address is not stored in the L-system MC_TID table 41L (step S201; NO), the packet processing unit 32 starts the processes from step S211 onward without causing the WAN-side interface unit 31 to transmit the MC packet onto the L-system transmission path. Moreover, the packet processing unit 32, if the MC_TID read from the L-system MC_TID table 41L is "null" (step S203; YES), starts the processes from S211 onward without causing the WAN-side interface unit 31 to transmit the MC packet onto the R-system transmission path.

Then, the packet processing unit 32, which has started the processes (the processes in steps S211 through S214) from step S211 onward, at first judges whether or not the target MC address is stored in the R-system MC_TID table 41R (see FIG. 9(b) showing the R-system table) (step S211). If the target MC address is stored in the R-system MC_TID table 41R (step S211; YES), the packet processing unit 32 reads the MC_TID associated with this target MC address from the R-system MC_TID table 41R (step S212). Subsequently, the packet processing unit 32 judges whether the MC_TID read from the R-system MC_TID table 41R is "null" or not (step S213). If the MC_TID is not "null" (step S213; NO), the packet processing unit 32 executes the process of transmitting onto the R-system transmission path the MC packet attached with the header in which the MC_TID is set (step S214), and thereafter terminates this MC packet transmitting process.

Whereas if the target MC address is not stored in the R-system MC_TID table 41R (step S211; NO), the packet processing unit 32 finishes transmitting the packet without making the WAN-side interface unit 11 transmit the MC packet onto the R-system transmission path. Further, the packet processing unit 32, if the MC_TID read from the R-system MC_TID table 41R is "null" (step S213; YES), terminates the MC packet transmitting process without causing the WAN-side interface unit 11 to transmit the MC packet onto the R-system transmission path.

As apparent from the explanation given above, the transmission device 30 according to the second embodiment is, though different from that of the transmission device 10 in terms of the judgment criterion about whether the MC packet should be transmitted to the next transmission device 30 or not, the device capable of building up the ring topology network having the same function as that of the network configured by using the transmission devices 10.

As discussed above, the transmission device according to the second embodiment transmits, as by the transmission device 10, to the other transmission devices 30 the multicast packet that is to be discarded (subjected to the terminating process) by the specified transmission device 30 (the transmission device 30 having no necessity of forwarding the received multicast packet to the next transmission device 30). Accordingly, the communication network configured by use of the transmission devices 30 functions as the network (having a smaller quantity of bands employed for forwarding the multicast packet than in the existing communication network where the multicast packet is forwarded to all the transmission devices), wherein the multicast packet is forwarded in a way that does not use the bands with futility.

Modified Modes

The transmission devices 10, 30 described above can make a variety of modifications. For example, the transmission devices 10, 30 can be modified into such devices that an administrator must set the arrangement sequence of the transmission devices. Further, the transmission devices 10, 30 can be also modified into devices connected via a 1-system transmission path. Moreover, the transmission devices 10, 30 may be, as a matter of course, constructed as devices using the respective tables (such as the receipt request table 20, etc) having specific structures different from those described above.

What is claimed is:

1. A transmission device for configuring a ring or cascade type communication network which includes two or more transmission devices and is used in such a form of each of said transmission devices being connected to a specified network, comprising:
   a first storage unit that stores a multicast address of each multicast packet that should be transmitted onto said network connected to said transmission device;
   a multicast packet receiving unit that receives a multicast packet where discard condition information is set, which is transmitted to said other transmission device;
   a multicast packet drop unit that transmit, as far as the multicast address set in the multicast packet received by said multicast packet receiving unit is coincident with any one of multicast addresses stored in said first storage unit, the multicast packet onto said network connected to said transmission device;
   a multicast packet transferring unit that transfers, if the discard condition information set in the multicast packet received by said multicast packet receiving unit does not indicate discarding by said transmission device, the multicast packet to said next transmission device, and discarding, if the discard condition information set in the multicast packet received by said multicast packet receiving unit indicates discarding by said transmission device, the multicast packet without transferring the multicast packet to said next transmission device;
   a second storage unit that stores architecture information showing an arrangement sequence of said plurality of transmission devices configuring said communication network, and all the multicast addresses stored in said first storage unit with respect to said respective transmission devices;
   an information updating unit that executes a process of updating most the multicast address stored in said second storage unit with respect to each of said transmission devices; and
   a multicast packet transmitting unit that specifies based on the information stored in said second storage unit, when the multicast packet is transmitted from the host on the network connected to said transmission device, said transmission device having no necessity of transferring the multicast packet to said next transmission device, and transmitting to said next transmission device the multicast packet in which to set discard condition information from which said multicast packet transferring unit of said specified transmission device judges that the multicast packet be indicated to be discarded by said transmission device.

2. A transmission device according to claim 1, wherein said multicast packet transmitting unit transmits the multicast packet in which a piece of identifying information of said specified transmission device is set as the discard condition information, and
   said multicast packet transferring unit judges that the discard condition information coincident with the identifying information of said transmission device indicates discarding by said transmission device.

3. A transmission device according to claim 1, wherein said multicast packet transmitting unit transmits to said next transmission device the multicast packet in which a hop count up to said specified transmission device is set as the discard condition information by said multicast packet transmitting unit, and
   said multicast packet transferring unit, if the discard condition information set in the multicast packet received by said multicast packet receiving unit is not "1", alters the discard condition information to the information representing a numerical value smaller by "1" than the previous discard condition information, and thereafter transfers this multicast packet to said next transmission device but discards this multicast packet without transferring to said next transmission device if the discard condition information is "1".

4. A transmission device according to claim 2 or 3, wherein said communication network is a network in which said plurality of transmission devices are connected via 2-system transmission paths,
   said multicast packet receiving unit is capable of receiving the multicast packets transmitted via the 2-system transmission paths,
   said multicast packet transferring unit transfers the multicast packets to said next transmission device via the transmission path along which this multicast packet to be transmitted, and
   said multicast packet transmitting unit transmits the respective multicast packets to other transmission devices normally via the 2-system transmission paths.

5. A transmission device according to claim 1, wherein said multicast packet transmitting unit moves to a status of, when detecting that a fault occurs in said communication network, transmitting the multicast packet in which to set the discard condition information from which said multicast packet transfer unit of any of said other transmission devices does not judge that the multicast packet be indicated to be discarded by said transmission device.

6. A transmission device according to claim 1, further comprising:

an architecture information updating unit that executes a process for updating the architecture information stored in said storage unit into information representing the latest architecture by performing communications with said other transmission devices.

7. A transmission device according to claim 1, further comprising:

an architecture information updating unit that executes a process for updating the architecture information stored in said second storage unit into information representing the latest architecture by performing communications with said other transmission device, wherein said multicast packet transmitting unit moves to a status of, when detecting that a fault occurs in said communication network, transmitting the multicast packet in which to set the discard condition information from which said multicast packet transferring unit of any of said other transmission devices does not judge that the multicast packet be indicated to be discarded by said transmission device, specifies based on the information stored in said second storage unit, when said architecture information updating unit completes updating of the architecture information, said transmission device having no necessity of transferring this multicast packet to said next transmission device, and returns to the status of transmitting to said next transmission device the multicast packet in which to set the discard condition information from which said multicast packet transferring unit of said specified transmission device judges that the multicast packet be indicated to be discarded by said transmission device.

\* \* \* \* \*